United States Patent [19]

Behr et al.

[11] Patent Number: 4,958,851
[45] Date of Patent: Sep. 25, 1990

[54] AIR BAG FIRING CIRCUIT

[75] Inventors: Leonard W. Behr, Pontiac; Craig W. White, Grosse Pointe, both of Mich.

[73] Assignee: Automotive Systems Laboratory, Inc., Farmington Hills, Mich.

[21] Appl. No.: 344,291

[22] Filed: May 1, 1989

[51] Int. Cl.$^5$ .............................................. B60R 21/32
[52] U.S. Cl. ................................... 280/735; 180/282; 307/10.1; 307/121
[58] Field of Search ........................ 280/735; 180/282; 340/52 H, 436, 523, 644; 307/10 R, 121, 10.1

[56] References Cited

U.S. PATENT DOCUMENTS

| | | | |
|---|---|---|---|
| 3,780,314 | 12/1973 | Inose et al. | 307/121 |
| 3,889,232 | 6/1975 | Bell | 280/375 |
| 3,890,594 | 6/1975 | Hosaka et al. | 180/274 |
| 4,438,424 | 3/1984 | Yasui | 280/735 |
| 4,695,075 | 9/1987 | Kamiji et al. | 280/735 |
| 4,804,859 | 2/1989 | Swart | 280/735 |
| 4,853,623 | 8/1989 | Sterler | 280/735 |

*Primary Examiner*—Richard A. Bertsch
*Attorney, Agent, or Firm*—Lyon & Delevie

[57] ABSTRACT

An air bag firing circuit comprises a firing path including in series a safing sensor, a squib, and a crash sensor. Each sensor comprises normally-open switch means operated by an inertial mass and shunted by a resistor. A battery maintains a known voltage across the firing path while suitable control means checks the integrity of the firing path by reading and comparing the voltages achieved at various points thereabout. The control means further tests each sensor individually by sequentially operating suitable test means incorporated therein, such as means for biasing the inertial mass of each sensor towards its switch means to operate same, while determining the effect of such testing on the voltages achieved about the firing path. Upon the detection of a sensor failure, the malfunctioning sensor is removed from the firing path as by operating low-resistance shunt means therefor, or by operating means incorporated within the sensor for operating the switch means thereof without regard to acceleration, such as means for biasing its inertial mass towards its switch means to close same, thereby ensuring continued protection of the vehicle passengers until the sensor is serviced or replaced. If the malfunctioning sensor is the high-threshold crash sensor, the control means operates means on the low-threshold safing sensor to increase the threshold thereof upon removal of the crash sensor from the firing path, thereby providing continuing protection for vehicle passengers.

28 Claims, 2 Drawing Sheets

AIR BAG FIRING CIRCUIT

BACKGROUND OF THE INVENTION

The instant invention relates to control circuits for vehicle passenger restraint systems, such as air bags, comprising a plurality of acceleration-responsive sensors.

Known air bag passenger restraint systems employ a control circuit wherein a power supply applies a voltage across a firing path which includes in series an explosive squib and a plurality of normally-open acceleration sensors, each of the sensors being shunted by a resistor having a nominal resistance substantially greater than the internal resistance of the squib. In normal operation, a small current flows through the circuit while the sensors remain in the normally-open position. The closure of the sensors upon collision or marked deceleration of the vehicle generates a significant rise in the current flowing through the squib, thereby "firing" the squib and deploying the air bag. See, e.g., U.S. Pat. No. 4,695,075, issued Sept. 22, 1987 to Kamiji et al.

Significantly, if any of the sensors fails to close in response to the collision or marked vehicle deceleration, e.g., the sensor becomes stuck in the "open" position, the current flowing through the squib will not rise upon such collision or marked vehicle deceleration and, thus, the air bag will not deploy, thereby placing the vehicle passengers at significant risk. Alternatively, in the event that any of the sensors fails with a propensity to close, e.g., becomes stuck in the closed position, the prior art teaches the disabling of the entire control circuit to prevent the unintentional or premature triggering of the passenger restraint, once again placing the passengers at risk. See, e.g., U.S. Pat. No. 3,889,232, issued June 10, 1975 to Bell, wherein the control circuit shuts down when one sensor closes without the corresponding closing of the other sensor.

Frequently, such known firing circuits comprise two acceleration sensors, one of which closes in response to an acceleration input which is lower than the acceleration input required to close the other sensor, whereby one sensor is essentially "armed" by the other sensor. In a variation on this theme, U.S. Pat. No. 3,780,314, issued Dec. 18, 1973 to Inose et al. teaches a control circuit wherein a low acceleration threshold "arming" sensor closes to energize a coil integral with a normally-open, high-threshold "crash" sensor. The energized coil generates a magnetic field which acts to reduce the magnetic bias on the inertial mass of the crash sensor below its nominal level, thereby decreasing its acceleration threshold—and, hence, increasing its sensitivity—as desired. The crash sensor is thereafter able to close in response to further acceleration inputs which are nonetheless below its nominal acceleration threshold, whereupon an increased current flows through the squib and the air bag is deployed.

In contrast to other known control circuits, the Inose et al. circuit "fails soft" in the event of a failure of the low-threshold arming sensor, i.e., a strong vehicle deceleration exceeding the crash sensor's nominal acceleration threshold will still cause the crash sensor to close, thereby and deploying the air bag. Unfortunately, however, the Inose et al. circuit cannot deploy the air bag in the event that the high-threshold crash sensor fails in the "open" position.

U.S. Pat. No. 3,890,594, issued June 17, 1975 to Hosaka et al. also teaches a control circuit for a vehicle safety device. A pair of crash sensors are normally urged in the open position by the delivery of a current through coils integral therewith, respectively, as controlled by a normally-closed "crush" sensor, e.g., a glass element with a conductive coating. In the event of a vehicle collision, the crush sensor opens to cut the current to the coils, thereby reducing the biasing force on the inertial mass of each crash sensor to increase the sensitivity thereof. The crash sensors are thereafter allowed to close in response to the deceleration attendant to the collision. As an alternate embodiment, Hosaka et al. teaches that a normally-open crush sensor may be employed so as to direct a current through the coils in the event of a collision, whereupon the coils generate a magnetic field which tends to urge the crash sensors to close, whereby the sensitivity of the sensors is likewise increased.

However, in either of the embodiments taught by Hosaka et al., in the event that either of the crash sensors thereof fails in the "open" position, the air bag cannot be deployed, and the vehicle passengers are once again placed at substantial risk.

SUMMARY OF THE INVENTION

It is an object of the instant invention to provide a control circuit for a vehicle passenger restraint system having means therein for detecting a failure of an acceleration-sensing component thereof without necessitating the disassembly of the firing circuit.

Another object of the instant invention is to provide a control circuit for a vehicle passenger restraint which can continue to operate notwithstanding the failure of an acceleration-sensing component thereof.

A further object of the instant invention is to provide a control circuit for a vehicle passenger restraint which automatically compensates for the failure of a high-threshold acceleration-sensing component thereof, whereby premature or unnecessary actuation of the restraint from a subsequent low-magnitude acceleration input is avoided.

The instant control circuit for a vehicle passenger restraint comprises first signal-generating means, such as a first acceleration sensor, for generating a first output signal in response to an acceleration input exceeding a first threshold; second signal-generating means, such as a second acceleration sensor, for generating a second output signal in response to an acceleration input exceeding a second threshold; and trigger means, in communication with the first and second sensors, for actuating the passenger restraint upon simultaneous receipt of the first and second signals therefrom. The instant control circuit further comprises failure detecting means for detecting a sensor malfunction, i.e., a failure of either of the sensors to properly respond to acceleration; and third signal-generating means responsive to the failure detecting means, in communication with the trigger means, for generating the signal normally generated by the malfunctioning sensor upon the detection of the failure thereof, whereby operability of the control circuit and, hence, vehicle passenger protection are maintained notwithstanding such sensor malfunction. Indicator means, such as a signal lamp, responsive to the failure detecting means informs vehicle passengers of a sensor malfunction.

In the event that the threshold of the malfunctioning sensor is nominally greater than the threshold of the other sensor, the control circuit further comprises means responsive to the failure detecting means for increasing the threshold of the other sensor. Thus, upon detecting a failure of the high-threshold "crash" sensor to properly respond to acceleration, the low-threshold "safing" sensor is temporarily recalibrated to function as a high-threshold crash sensor until such time as the malfunctioning crash sensor is serviced or replaced. In this manner, the instant control circuit automatically compensates for the failure of the high-threshold acceleration-sensing component thereof, and the vehicle passengers are afforded continuing protection.

In a preferred embodiment of the instant control circuit for deploying an air bag passenger restraint, the first and second signal-generating means comprise a pair of acceleration-responsive sensors having switch means in electrical communication with a common electrical signal-generating means, such as a battery. The trigger means comprises, for example, an explosive squib connected in series with the switch means of each sensor. The switch means of the first and second sensors close upon experiencing an acceleration (deceleration) input exceeding the first and second nominal thresholds thereof, respectively. For example, each sensor comprises means for normally biasing the switch means thereof to its open position, with such normal biasing means being overcome by an acceleration input exceeding the threshold of the sensor, whereupon the switch means of the sensor closes in response to such acceleration. Upon the simultaneous closure of the switch means of both sensors, the resulting electrical current flowing through the squib explodes same and thus triggers deployment of the air bag.

The failure detecting means of the preferred embodiment comprises means for testing each sensor, such as means for operating the switch means thereof without regard to acceleration, and means for detecting the change in the output of each sensor upon operating such sensor testing means. For example, in the preferred embodiment, where each sensor comprises first biasing means for normally biasing the switch means thereof to its open position, the failure detecting means comprises second biasing means operable to bias the switch means of the sensor from its normally-open position to its closed position without regard to acceleration. Where the switch means of each sensor comprises a portion of a firing path across which a known voltage is applied, as in the preferred embodiment, the operative state of each switch means is ascertained by detecting and comparing the voltage achieved at a point about the firing path before and during operation of such second biasing means. Additionally, the instantaneous position of the switch means of each sensor and, hence, information regarding its operative state is also ascertained by detecting and comparing the voltages achieved at various points about the firing path.

The third signal-generating means of the preferred embodiment comprises means for shunting the switch means of the malfunctioning sensor, whereby the malfunctioning sensor is functionally removed from the firing path. Alternatively, the third signal-generating means comprises switch-operating means for operating the switch of the malfunctioning sensor without regard to acceleration. In this regard, it is noted that the second biasing means of the failure detecting means used to test sensor function may be used to close the switch means of the malfunctioning sensor and thereafter maintain the switch means thereof in the closed position, whereby the malfunctioning sensor is similarly functionally removed from the firing path. Thus, upon detecting a sensor failure, the failure detecting means of the instant control circuit operates the shunt means or switch-operating means thereof, whereby the signal normally generated by the malfunctioning sensor is sent to the trigger means notwithstanding the sensor malfunction, and continuing operability of the instant control circuit is ensured.

DETAILED DESCRIPTION OF THE PREFERRED EMBODIMENT OF THE INVENTION

Figure 1:
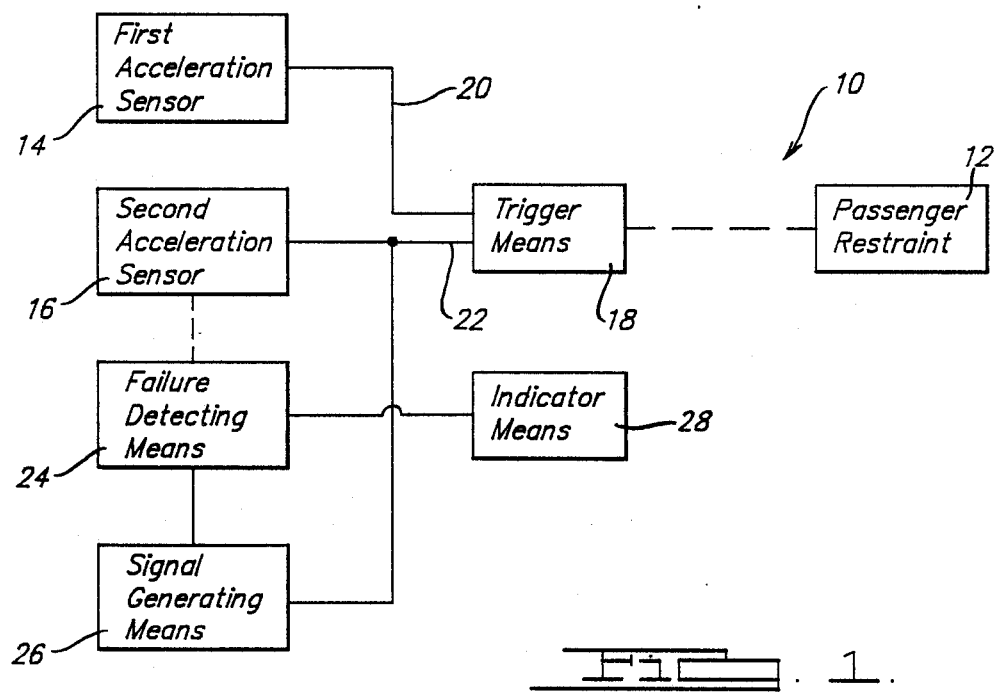
FIG. 1 is a block diagram of the passenger restraint control circuit of the instant invention.

Referring to the FIG. 1, the control circuit 10 of the instant invention for actuating a vehicle passenger restraint 12 comprises first and second signal-generating means, such as first and second acceleration sensors 14 and 16, for generating a first and second output signal, respectively, in response to acceleration inputs thereto exceeding their respective thresholds. A trigger means 18, in communication with the first and second sensors 14 and 16 via signal lines 20 and 22, actuates a passenger restraint 12 upon simultaneous receipt of the first and second signals from the sensors 14 and 16. The control circuit 10 further comprises failure detecting means 24 for detecting a failure of the second sensor 16 to properly respond to acceleration; and additional signal-generating means 26 responsive to the failure detecting means 24, also in communication with the trigger means 18 via signal line 22, for generating the signal normally generated by the second sensor 16—that is, the output signal of the second sensor 16 when experiencing an acceleration input exceeding its threshold—upon the detection of the failure thereof. Indicator means 28 responsive to the failure detecting means informs vehicle passengers of a sensor malfunction.

It is noted that, for ease of illustration, FIG. 1 shows failure detecting means 24 and signal-generating means 26 responding solely to a malfunction of the second acceleration sensor 16. It will be readily appreciated, however, that the first acceleration sensor 14 may also be provided with failure detecting and signal-generating means therefor, as in the constructed embodiment 50 of the instant control circuit shown in FIG. 3 and described hereinbelow.

Figure 2:
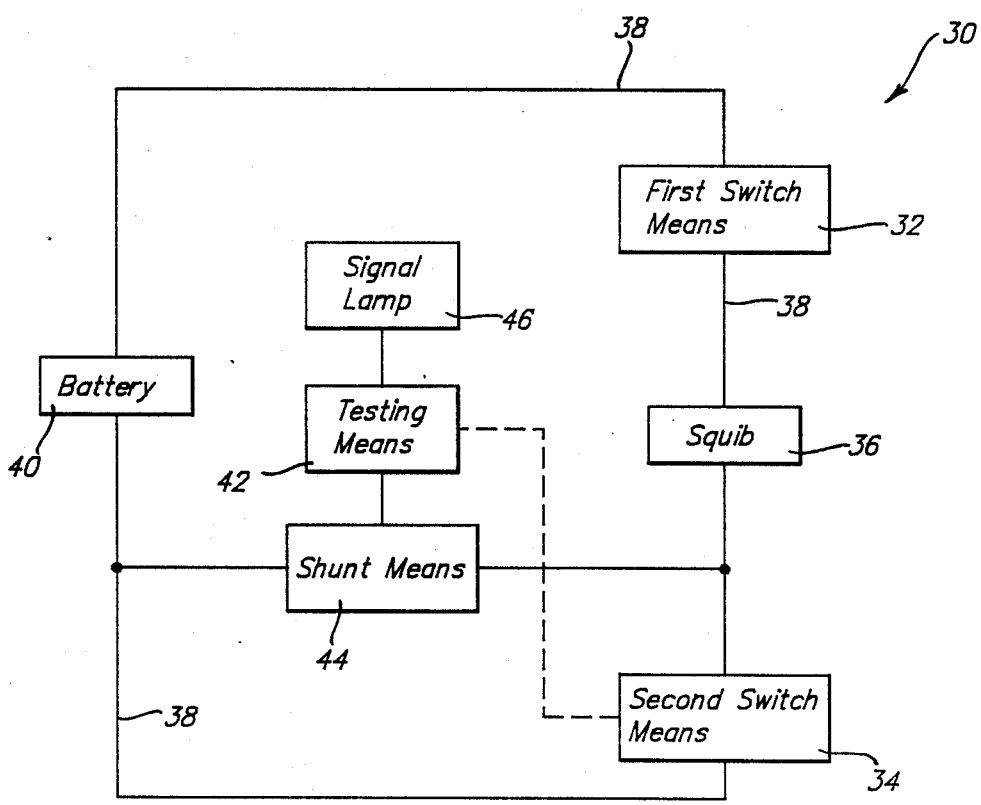
FIG. 2 is a schematic electrical block diagram of the preferred embodiment of the instant control circuit having acceleration sensors comprising switch means operating to generate an output signal from the sensors when the acceleration inputs thereto exceed the thresholds thereof, respectively.

FIG. 2 is a schematic electrical block diagram of a control circuit 30 constructed in accordance with the instant invention wherein the first and second acceleration sensors thereof comprise first and second normally-open switch means 32 and 34, respectively, which close in response to an acceleration input exceeding a first and second threshold, respectively. For example, each sensor comprises means for normally biasing the switch means thereof to its open position, with such normal biasing means being overcome by an acceleration input exceeding the threshold of the sensor, whereupon the switch means of the sensor is closed in response to such acceleration. The switch means 32 and 34 of each sensor is connected in series with electrically-operated trigger means, such as an explosive squib 36, to form the firing path 38 of the control circuit 30. An electrical signal generator, such as a battery 40, applies a voltage across the firing path 38, whereby a voltage "signal" is sent to the squib 36 upon the closing of each of the switch means 32 and 34, respectively. The simultaneous closure of the switch means 32 and 34 of both sensors produces a large current flow through the firing path 38 and, hence, through the squib 36, causing the latter to explosively trigger the deployment of the passenger restraint controlled thereby (not shown).

The control circuit 30 of FIG. 2 further comprises testing means 42 for detecting a failure of the second switch means 34 to properly respond to acceleration; and shunt means 44 responsive to the testing means 42 operable to shunt the second switch means 34 upon the detecting of a failure thereof, whereby the second switch means 34 is functionally removed from the firing path 38 of the control circuit. A signal lamp 46 responsive to testing means 42 informs vehicle passengers of the malfunction of the second switch means 34.

Figure 3:
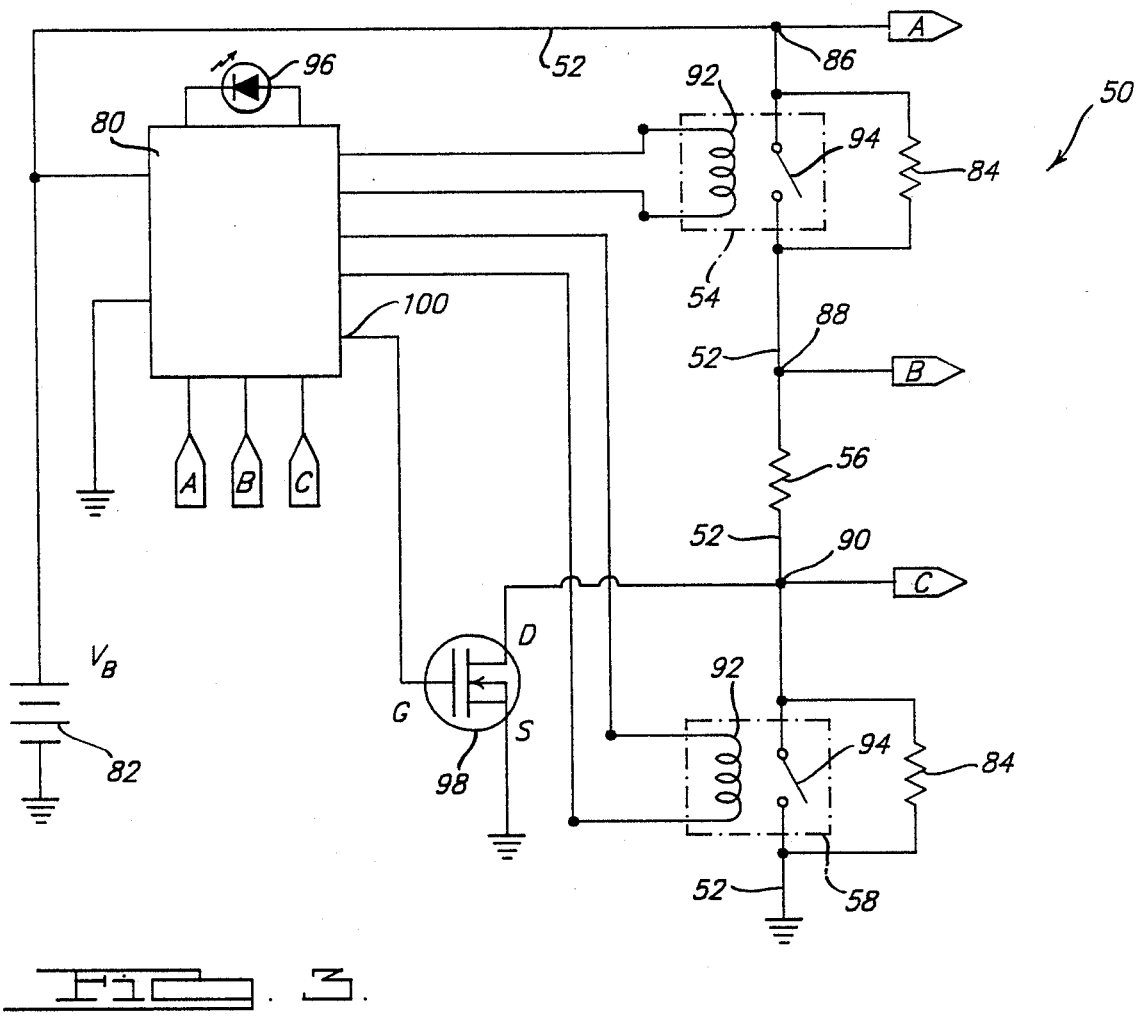
FIG. 3 is a schematic circuit diagram of an air bag firing circuit constructed in accordance with the instant invention.

Referring to FIG. 3, an air bag firing circuit 50 constructed in accordance with the instant invention for deploying an air bag (not shown) comprises a firing path 52 which includes in series a low-threshold acceleration-responsive sensor (hereinafter "safing sensor 54"), an explosive squib 56, and a high-threshold acceleration-responsive sensor (hereinafter "crash sensor 58"). More specifically, the safing sensor 54 detects a first condition requiring the deployment of the air bag, such as an acceleration input thereto exceeding a first threshold; and the crash sensor 58 detects a second condition requiring the deployment of the air bag, such as an acceleration input exceeding a second threshold, with the second threshold of the crash sensor 58 being nominally greater than the first threshold of the safing sensor 54.

Figure 4:
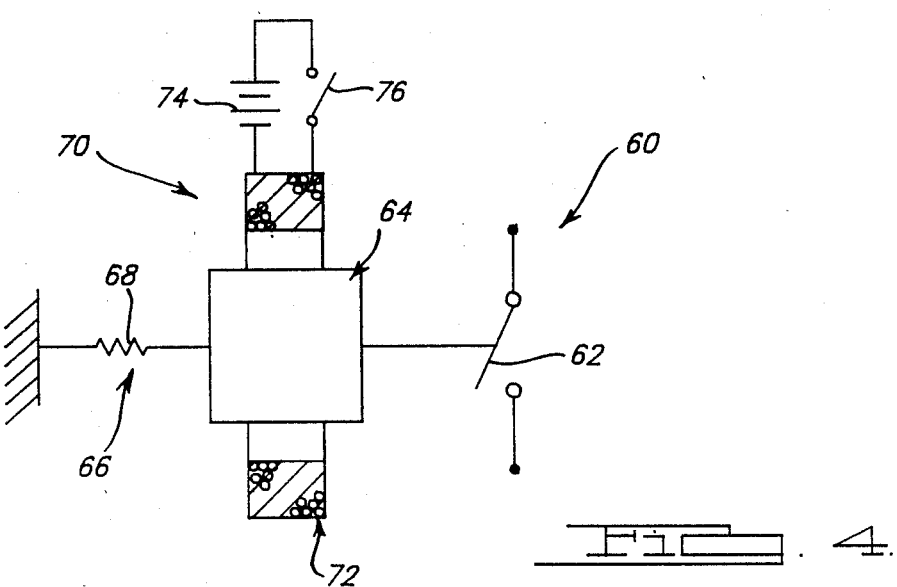
FIG. 4 is a schematic representation of each acceleration sensor employed in the air bag firing circuit of FIG. 3.

A schematic representation of an exemplary sensor 60 is shown in FIG. 4. A constructed embodiment of the sensor 60 is taught in co-pending U.S. patent application Ser. No. 07/248,143, filed Sept. 23, 1988 and assigned to the assignee of the instant invention, and is hereby incorporated herein by reference. Referring to FIG. 4, each sensor 60 comprises normally-open switch means (hereinafter "switch 62") which is operated by an acceleration-responsive inertial mass 64. The inertial mass is normally biased away from the switch 62 by suitable first biasing means 66, represented schematically in the figure as spring 68. The first biasing means 66 acts to bias the inertial mass away from the switch 62, i.e., to maintain the switch 62 in the open position, until the biasing force is overcome by the acceleration input to the sensor 60, whereupon the inertial mass 64 moves towards the switch 62 to close same.

Each sensor 60 further comprises second biasing means 70 operable to bias its inertial mass 64 towards its switch 62 to close same without regard to acceleration, represented schematically in FIG. 4 as a coil 72 which magnetically interacts with the inertial mass 64 upon the delivery of a direct current therethrough, as by connecting the coil 72 with battery 74 via switch 76. Such second biasing means 70 permits both the testing of the sensor without regard to acceleration, and a means for closing and maintaining the switch 62 of the sensor in its closed position upon detecting a failure thereof, as will be described more fully hereinbelow. And, by reversing the direction of current flow through the coil 76, such second biasing means 70 is additionally operable to increasingly bias the inertial mass 64 away from the switch 62, thereby affording means integral with the sensor 60 for increasing the threshold thereof above its nominal value. The flow of current through the coil 72, including its direction, is controlled by suitable control means 80 in the manner described hereinbelow.

Referring once again to FIG. 3, a battery 82 is connected across the firing path 52 to apply a known voltage $V_B$ thereacross which is able to provide a current therethrough sufficient to explode the squib 56. A reserve power supply (not shown) may be employed to maintain the applied voltage at a level sufficient to deploy the air bag in the event that the battery 82 malfunctions or is otherwise isolated from the firing circuit 50 during a vehicle collision.

The normally-open safing and crash sensors 54 and 58 of the firing path 52 are each shunted by a resistor 84 of like nominal resistance. Preferably, the nominal resistance of the shunting resistors 84 is several orders of magnitude larger than the nominal internal resistance of the squib 56. For example, where the nominal internal resistance of the squib is about 2 ohms, the shunting resistors preferably comprise 2 k resistors. In normal operation, the shunting resistors 84 maintain a relatively low current flow through the firing path 52 and, hence, through the squib 56 thereof. Upon the simultaneous closure of both sensors 54 and 58 due to an acceleration exceeding the respective thresholds thereof, the shunting resistors 84 are shorted, whereby the current flowing through the squib 56 is increased to a value above the firing threshold thereof to explode same and trigger deployment of the air bag.

In accordance with another feature of the instant invention, the control means 80 reads and compares the voltages achieved at a plurality of points 86, 88, and 90 about the firing path 52 via suitable input ports "A", "B", and "C" thereon to determine if any of the components thereof has malfunctioned or "failed," e.g., whether either sensor is stuck in the closed position. In the event of a malfunction of either of the sensors 54 and 58, or of the squib 56, the normal flow of current through the firing path 52 is disrupted, thereby altering the voltages at one or more points thereabout. Since each malfunction affects the voltages achieved about the firing path in a different manner, the identity of the malfunctioning component is determined upon examination and comparison of such voltages.

In the event that the voltage readings from the points about the firing path are consistent with open sensors, the control means 80 further tests the operability of each sensor by sequentially operating the second biasing means 92 of each sensor to close its switch 94 while monitoring the voltages achieved about the firing path. For example, upon operating the second biasing means 92 of a properly functioning safing sensor 54, the voltage achieved at point 88 on the firing path 52 should increase relative to ground. An additional comparison of the resulting voltage at point 88 with the voltage achieved at point 86 on the firing path 52, and/or the nominal battery voltage $V_B$ may serve to further confirm the integrity of the portion of the firing path proximate the safing sensor. Similarly, the proper functioning of the crash sensor 58 of the instant firing circuit 50 is established by monitoring the change in the voltage achieved at point 90 thereon upon operating the second biasing means 92 thereof.

The proper dynamic operation of each sensor 54 and 58 is tested by measuring the time interval required for the switch 94 thereof to close upon operating the second biasing means 92 thereof, whereby the proper functioning of both the normal (first) biasing means on the sensor's inertial mass and any damping means employed by the sensor may be confirmed. The failure of the sensor's switch to close, a sluggish switch closing, or too-rapid a closing of the sensor's switch is indicative of a potentially critical sensor malfunction, in response to which the control means 80 operates means for removing the malfunctioning sensor from the firing path 52 in the manner discussed hereinbelow, whereby continuing operability of the firing path and, hence, continuing protection of the vehicle passengers are ensured. It is noted that the operation of each sensor's second biasing means 92 may additionally serve to free a sensor which, for example, has become stuck in the open position and would otherwise be inoperable, whereby continuing sensor operability is achieved.

A signal lamp comprising, for example, a light-emitting diode 96 is illuminated by the control means 80 upon detection of a sensor malfunction in order to inform the vehicle passengers of such malfunction.

Referring once again to FIG. 3, the firing circuit 50 further comprises shunt means, such as an n-channel MOSFET 98, operable by the control means 80 upon detecting a malfunction of the crash sensor 58. More specifically, the MOSFET 98 has its drain connected to the firing path 52 between the squib 56 and the switch 94 of the crash sensor 58, its source connected to ground, its bulk internally tied to its source, and its gate connected to suitable output means 100 on the control means 80. The control means normally grounds the gate of the MOSFET, whereby no current is permitted to flow through the shunt. Upon detecting a malfunction of the crash sensor 58, the control means 80 applies a voltage to the gate of the MOSFET 98, thereby turning on the transistor to form a low-resistance shunt between point 90 on the firing path 52 and ground. The malfunctioning crash sensor is thus functionally removed from the firing path.

Alternatively, upon detecting a malfunction of the crash sensor 58, the control means 80 operates the second biasing means 92 thereof to close its switch 94, whereafter the switch is held in the closed position by the continuing operation of the second biasing means to remove the sensor from the firing path 52.

Similarly, upon detecting a malfunction of the safing sensor 54, the control means 80 operates the second biasing means 92 thereof to close its switch 94, whereby a failing safing sensor is removed from the firing path to permit continuing operation of the instant firing circuit 50.

It is noted that, where the firing path 52 further comprises an additional sensor (not shown) of similar configuration connected in parallel with either the safing sensor 54 or crash sensor 58 for purposes of redundancy, the additional sensor may be employed to shunt a malfunctioning sensor by operating the second biasing means 92 of the additional sensor to close the switch 94 means thereof. As such, the additional sensor provides further assurance that the malfunctioning sensor will indeed be functionally removed from the firing path 52 of the instant firing circuit 50 without compromising the continuing viability thereof.

It is noted that the control means 80 may comprise microprocessor means (not shown) for executing the above diagnostic sequence, which sequence may further include the steps of reading the voltages at various points about the firing path several times and calculating average values therefrom for use in the detection of a component failure; signaling the identity of the failed component, as by a coded sequence, via the LED 96; and verifying the physical attachment of the acceleration sensors to the vehicle frame through the use of additional sensing means therefor (not shown). Incremental counters may also be employed to determine whether an indicated malfunction is an aberration, such as a momentary closure of one of the sensors, or an actual component failure. The microprocessor may further incorporate a deadman timer to ensure continued diagnostic capability for the instant firing circuit 50, as by causing the microprocessor to begin at a specific point in the instructions therefor in the event that the microprocessor is tied up by a random external disturbance.

In accordance with another feature of the instant invention, the threshold of the crash sensor 58 is nominally greater than the threshold of the safing sensor 54. Thus, in normal operation, the safing sensor 54 acts to "arm" the crash sensor 58, whereafter the crash sensor 58 discriminates between further acceleration inputs thereto in order to avoid unintentional or premature deployment of the air bag. In the event of a failure of the crash sensor 58, the threshold of the safing sensor 54 must be increased above its nominal value, preferably to a point where it is substantially equal to the crash sensor's nominal threshold, in order to ensure continuing operability of restraint without encouraging such unintentional or premature deployment thereof. The instant air bag firing circuit 50 therefor further comprises means responsive to the failure detecting means for increasing the threshold of the safing sensor 54 upon the detecting of a malfunction of the crash sensor and the subsequent removal of the crash sensor from the firing path as by operation of MOSFET 98.

As indicated hereinabove, in the preferred embodiment, an increase in the acceleration threshold of the safing sensor 54 is readily achieved through an alternate use of the second biasing means 92 of the sensor, as by reversing the current flow through coil 72 of the sensor 60 shown schematically in FIG. 4. Thus, upon detecting a failure of the high-threshold crash sensor 58 to properly respond to acceleration, the nominally-low-threshold safing sensor 54 is temporarily recalibrated to function as a high-threshold discriminating sensor until such time as the malfunctioning crash sensor 58 is serviced or replaced.

It is noted that co-pending U.S. patent application Ser. No. 07/249,366, filed Sept. 23, 1988 and assigned to the assignee of the instant invention, teaches an air bag firing circuit comprising two crash sensors and two safing sensors connected to an explosive squib so as to trigger the deployment of at least one air bag upon the simultaneous closure of one of the crash sensors and one of the safing sensors. The firing circuit thus provides redundant firing paths to permit continued operation of the firing circuit notwithstanding the failure a single crash or safing sensor. The '366 application further teaches the use of a pair of diode bridges to obtain full firing circuit diagnosability, whereby the malfunction of any given sensor is readily detected. The teachings of the '366 application are hereby incorporated herein by reference.

In accordance with the instant invention, upon the detection of a failure of one of the crash sensors, the switch means of either crash sensor is closed by operating the second biasing means thereof in the manner described hereinabove, whereby both crash sensors are functionally removed from the firing path. As noted hereinabove, the still-operating crash sensor is thus able to operate as a means for shunting the malfunctioning crash sensor.

Alternatively, the normal (first) bias on the switch means of the malfunctioning sensor may be increased as by operating the second biasing means thereof in the manner also described hereinabove, whereby the switch means of the malfunctioning sensor is maintained in the open position without regard to acceleration. The other crash sensor then remains in the firing path to provide continuing protection to the vehicle passengers. In this regard, it is noted that, where the threshold of the still-operating crash sensor differs from that of the malfunctioning crash sensor, as where the two crash sensors experience different acceleration inputs from a given vehicle acceleration due to the positioning thereof within the vehicle, the threshold of the still-operating sensor is increased or decreased by operating the second biasing means thereof so as to obtain maximum protection of the vehicle passengers.

Similarly, upon the detection of a failure of one of the safing sensors to properly respond to acceleration, the other safing sensor may be employed to shunt the malfunctioning safing sensor; or the switch means of the malfunctioning safing sensor may be maintained in the open position by the second biasing means thereof, with the other safing sensor continuing to maintain firing circuit viability. Indeed, it will be readily appreciated that, under the instant invention, such a firing circuit would still remain operational notwithstanding the failure of both crash sensors and one of the safing sensors by (1) shunting the crash sensors as by closing same; (2) maintaining the switch means of the failed safing sensor in its open position as by operating the second biasing means thereof; and (3) increasing the threshold of the operable safing sensor above its nominal value, e.g., to the nominal value of a hypothetical crash sensor similarly positioned within the vehicle.

While the preferred embodiment of the invention has been disclosed, it should be appreciated that the invention is susceptible of modification without departing from the spirit of the invention or the scope of the subjoined claims.

We claim:

1. In a control circuit for a vehicle passenger restraint comprising
   first signal-generating means for generating a first output signal in response to an acceleration input exceeding a first threshold;
   second signal-generating means for generating a second output signal in response to an acceleration input exceeding a second threshold; and
   trigger means, in communication with said first and second signal-generating means, for actuating said vehicle passenger restraint upon simultaneous receipt of said first and second signals therefrom;
   the improvement comprising
   failure detecting means for detecting a failure of said second signal-generating means to properly respond to acceleration; and
   third signal-generating means responsive to said failure detecting means, in communication with said trigger means, for generating said second signal upon failure of said second signal-generating means.

2. The control circuit of claim 1 wherein
   said second signal-generating means comprises switch means; and
   said failure detecting means comprises first switch-operating means for testing said switch means by operating same without regard to acceleration.

3. The control circuit of claim 2 wherein
   said second signal-generating means comprises first biasing means for biasing said switch means thereof to a first position, said first biasing means being overcome by an acceleration input exceeding said second threshold, whereupon said switch means is switched in response to such acceleration to a second position; and
   said first switch-operating means of said failure detecting means comprises second biasing means operative to bias said switch means to said second position.

4. The control circuit of claim 2 wherein
   said second signal-generating means further comprises second switch-operating means including an inertial mass for operating said switch means of said second signal-generating means, and first biasing means for biasing said inertial mass away from said switch means, said inertial mass operating said switch means when said first biasing means is overcome by an input acceleration exceeding said second threshold; and
   said first switch-operating means comprises second biasing means operative to bias said inertial mass toward said switch means to operate same.

5. The control circuit of claim 2 wherein said failure detecting means further comprises
   signal detecting means for detecting the output of said second signal-generating means; and
   comparator means, in communication with said signal detecting means, for comparing said detected output of said second signal-generating means before operating said first switch-operating means with said detected output of said second signal-generating means when operating said first switch-operating means.

6. The control circuit of claim 1 wherein
   said first and second signal-generating means comprise first and second normally-open switch means which close in response to acceleration inputs exceeding said first and second thresholds, respectively;
   and including
   a firing path comprising in series said first switch means, said trigger means, and said second switch means; and
   means for applying a voltage across said firing path.

7. The control circuit of claim 6 wherein
   said trigger means has internal electrical resistance;
   said first and second switch means are shunted by a first and second resistor, respectively, said first and second resistors having a resistance substantially greater than said internal resistance of said trigger means; and said failure detecting means comprises means for reading the voltages achieved at a plurality of points on said firing path, and comparator means for comparing the voltage achieved at one of said points with the voltage achieved at another of said points.

8. The control circuit of claim 6 wherein said failure detecting means comprises
switch-closing means for closing said second switch means without regard to acceleration;
voltage-detecting means for detecting the voltage drop across said second switch means; and
comparator means, in communication with said voltage detecting means, for comparing the voltage drop across said second switch means before operating said switch-closing means with the voltage drop across said second switch means when operating said switch-closing means.

9. The control circuit of claim 1 wherein
said second signal-generating means comprises switch means; and
said third signal-generating means comprises means for shunting said switch means.

10. The control circuit of claim 1 wherein
said second signal-generating means comprises switch means; and
said third signal-generating means comprises first switch-operating means for operating said switch means without regard to acceleration.

11. The control circuit of claim 10 wherein
said second signal-generating means comprises first biasing means for biasing said switch means thereof to a first position, said first biasing means being overcome by an acceleration input exceeding said second threshold, whereupon said switch means is switched in response to such acceleration to a second position; and
said first switch-operating means of said third signal-generating means comprises second biasing means operative to bias said switch means to said second position.

12. The control circuit of claim 10 wherein
said second signal-generating means further comprises second switch-operating means including an inertial mass for operating said switch means of said second signal-generating means, and first biasing means for biasing said inertial mass away from said switch means, said inertial mass operating said switch means when said first biasing means is overcome by an acceleration input exceeding said second threshold; and
said first switch-operating means comprises second biasing means operative to bias said inertial mass toward said switch means to operate same.

13. The control circuit of claim 1 wherein
said second threshold is nominally greater than said first threshold,
and including
means responsive to said failure detecting means for increasing said first threshold above its nominal value,
whereby an acceleration input greater than said nominal value of said first threshold is required to generate said first signal upon failure of said second signal-generating means.

14. The control circuit of claim 13 wherein
said first signal-generating means comprises first biasing means for biasing said switch means thereof to a first position, said first biasing means being overcome by an acceleration input exceeding said first threshold, whereupon said switch means is switched in response to such acceleration to a second position, and
said means responsive to said failure detecting means for increasing said first threshold above its nominal value comprises second biasing means operative to increasingly bias said switch means to said first position.

15. The control circuit of claim 13 wherein
said first signal-generating means comprises an inertial mass, switch means, and first biasing means for biasing said inertial mass away from said switch means, said inertial mass operating said switch means when said first biasing means is overcome by an acceleration exceeding said first threshold; and
said means responsive to said failure detecting means for increasing said first threshold above its nominal value comprises second biasing means for increasing the bias on said inertial mass away from said switch means.

16. The control circuit of claim 1 including indicator means responsive to said failure detecting means for indicating failure of said second signal-generating means upon detection thereof.

17. The control circuit of claim 16 wherein said indicator means comprises a signal lamp.

18. A control circuit for a vehicle passenger restraint comprising
a firing path including in series
trigger means for actuating said restraint, said trigger means having internal electrical resistance; and
first and second normally-open switch means which close in response to an acceleration input exceeding a first and second threshold, respectively, said first and second switch means being shunted, respectively, by first and second shunting resistors, each of said shunting resistors having a resistance substantially greater than the internal resistance of said trigger means;
means for applying a voltage across said firing path;
failure detecting means for detecting a failure of said second switch means to properly respond to acceleration; and
shunt means responsive to said failure detecting means for shunting said second switch means upon detection of a failure of said second switch means.

19. The control circuit of claim 18 wherein said failure detecting means comprises
switch-closing means operative to close said second switch means;
voltage-detecting means for detecting the voltage at a point on said firing path; and
comparator means for comparing the voltages at said point before and during operation of said switch-closing means.

20. The control circuit of claim 18 wherein said failure detecting means comprises
voltage-detecting means for detecting the voltages at a plurality of points on said firing path; and
comparator means for comparing the voltage at one of said points with the voltage at another of said points.

21. The control circuit of claim 18 wherein
said second threshold is nominally greater than said first threshold;

and including
  means responsive to said failure detecting means for increasing said first threshold above its nominal value,
whereby an acceleration input greater than said nominal value of said first threshold is required to close said first switch means upon failure of said second switch 22. The control circuit of claim 21 wherein said means responsive to said failure detecting means for increasing said first threshold above its nominal value comprises
  additional means for biasing said first switch means in said normally-open position.

23. The control circuit of claim 18 wherein
  said firing path further includes third normally-open switch means in parallel with said second switch means which closes in response to an acceleration input exceeding a third threshold; and
  said shunting means comprises means for closing said third switch means without regard to acceleration.

24. A control circuit for a vehicle passenger restraint comprising
  a firing path including in series
    trigger means for actuating said restraint, said trigger means having internal electrical resistance; and
    first and second normally-open switch means which close in response to an acceleration input exceeding a first and second threshold, respectively, said first and second switch means being shunted, respectively, by first and second shunting resistors, each of said shunting resistors having a resistance substantially greater than the internal resistance of said trigger means;
  means for applying a voltage across said firing path;
  failure detecting means for detecting a failure of said second switch means to properly respond to acceleration; and
  switch-closing means responsive to said failure detecting means for closing said second switch means without regard to acceleration.

25. The control circuit of claim 24 wherein said failure detecting means comprises
  voltage-detecting means for detecting the voltage at a point on said firing path; and
  comparator means for comparing the voltages at said point before and during operation of said switch-closing means.

26. The control circuit of claim 24 wherein said failure detecting means comprises
  voltage-detecting means for detecting the voltages at a plurality of points on said firing path; and
  comparator means for comparing the voltage at one of said points with the voltage at another of said points.

27. The control circuit of claim 24 wherein
  said second threshold is nominally greater than said first threshold;
and including
  means responsive to said failure detecting means for increasing said first threshold above its nominal value,
whereby an acceleration input greater than said nominal value of said first threshold is required to close said first switch means upon failure of said second switch means.

28. The control circuit of claim 27 wherein said means responsive to said failure detecting means for increasing said first threshold above its nominal value comprises
  additional means for biasing said first switch means in said normally-open position.

* * * * *